(No Model.) 2 Sheets—Sheet 1.
J. W. ANDERSON.
ANIMAL TRAP.
No. 587,255. Patented July 27, 1897.
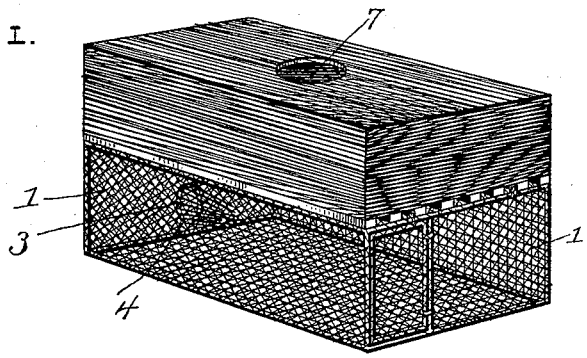
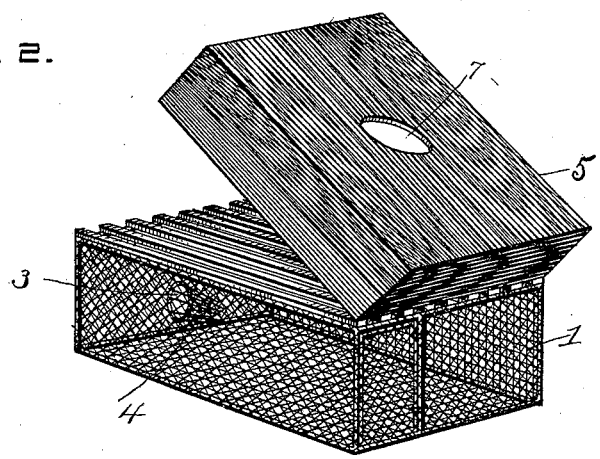
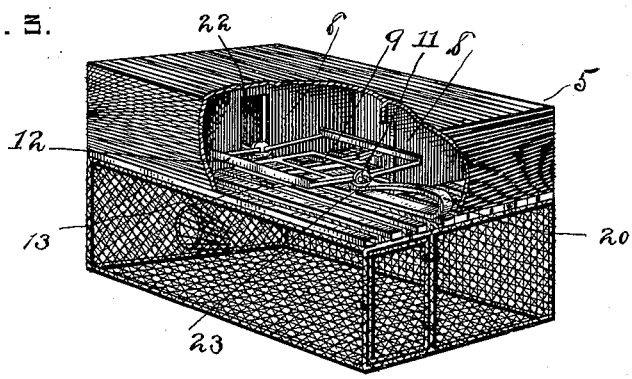
Witnesses:
F. S. Belt.
J. A. Willson.
Inventor:
J W Anderson,
by H. B. Willson,
Attorney:

(No Model.) 2 Sheets—Sheet 2.

J. W. ANDERSON.
ANIMAL TRAP.

No. 587,255. Patented July 27, 1897.

Witnesses:
F. S. Belt
J. A. Wilson

Inventor:
J W Anderson,
by H. B. Wilson.
Attorney.

THE NORRIS PETERS CO., PHOTO-LITHO., WASHINGTON, D. C.

UNITED STATES PATENT OFFICE.

JAMES WILLIAM ANDERSON, OF FULLER, MISSISSIPPI.

ANIMAL-TRAP.

SPECIFICATION forming part of Letters Patent No. 587,255, dated July 27, 1897.

Application filed February 27, 1897. Serial No. 625,365. (No model.)

*To all whom it may concern:*

Be it known that I, JAMES WILLIAM ANDERSON, a citizen of the United States, residing at Fuller, in the county of Jones and State of Mississippi, have invented certain new and useful Improvements in Animal-Traps; and I do declare the following to be a full, clear, and exact description of the invention, such as will enable others skilled in the art to which it appertains to make and use the same.

My invention has relation to improvements in animal-traps, and more particularly to that class of decoy-traps for hawks, owls, and the like, as well as minks, rats, and similar rodents, and the object is to provide a simple and effective trap of this kind.

To this end the novelty consists in the construction, combination, and arrangement of the same, as will be hereinafter more fully described, and particularly pointed out in the claim.

In the accompanying drawings the same reference-characters indicate the same parts of the invention.

Figure 4:
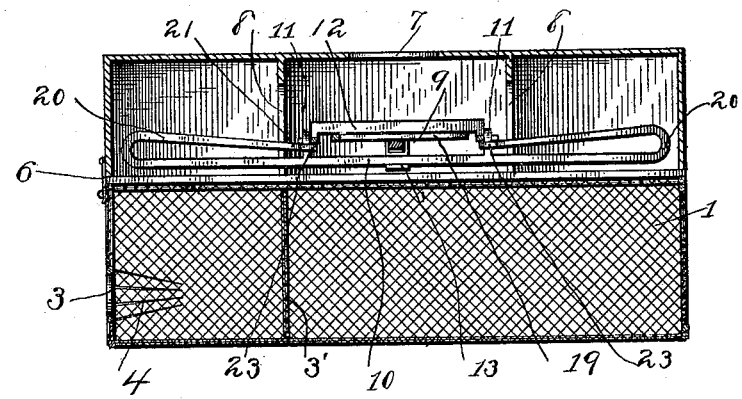
Figure 5:
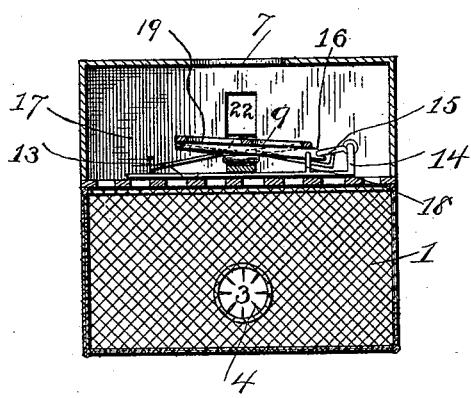

Figure 1 is a perspective view of my improved animal-trap. Fig. 2 is a similar view with the trap-chamber raised. Fig. 3 is a perspective view with a portion of the trap-chamber broken away to show the steel trap within. Fig. 4 is a longitudinal section through the trap, and Fig. 5 is a transverse section of the same.

1 represents the decoy or bait chamber, which is preferably an open-wire cage having the usual door at one end and at the other a circular inlet 3, consisting of an annular series of converging wires 4 4, pointed at their converging ends, which form an easy mode of entrance for the rodent, but which effectually prevent its egress. A hinged transverse partition 3' separates the bait-chamber into two compartments.

5 represents a closed cover hinged at one end to the top of the bait-chamber and fastened at the other end by a hasp and staple 6.

7 represents an orifice in the top of the hinged cover, and 8 8 are fixed transverse partitions in the cover, one on each side of the orifice 7, and between these partitions 8 8 is secured the steel spring-trap 9. This trap consists of a longitudinal bar 10, the ends of which are turned up to form parallel ears 11 11, in which are pivoted the inner ends of the rectangular steel jaws 12 12'.

A transverse arm 13 is secured midway to the bar 9, and one end of said arm is turned upwardly to form the ear 14, to which is hinged the trigger 15, the free end of which extends across the jaw 12 and engages the notch 16 in the lever 17, fulcrumed in the bracket 18 on the arm 13. This lever 17 supports an open-frame platform 19, which is located immediately below the orifice 7 in the cover 5.

20 represents a duplex spring the body portion of which is secured to the bar 10 and extends parallel with it, the outer ends 21 21 being turned back through the slots 22 in the partitions 8 8, and their free ends are formed with an eye 23, which encompasses the vertical ears 11 11 and engage the contiguous pivoted ends of the jaws 12 12', so that when the platform 19 is pressed down it releases the trigger 15 and the spring closes the jaws in the usual manner of traps of this kind.

When the trap is to be set for hawks and owls, it is prepared by placing a live chicken, bird, or even a rat in the bait-chamber, and the trap is then fastened on a stake or the stump of a tree, as shown in Fig. 1. The movements of the live bait attract the attention of the hawk, which is compelled to alight on the top of the trap, where it sees the live bait through the orifice 7, and in attempting to reach it with its claw through said orifice it presses the platform 19 down and releases the jaws, which secure the leg of the bird.

When the trap is intended for rodents, the usual bait is placed in the bait-chamber and the animal has its free access thereto through the inlet 3, which of course bars its exit, as above explained, and should the animal attempt to reach the bait-chamber through the orifice 7 it will necessarily trip the platform 19 and be caught by the jaws 12 12'.

Having thus fully described my invention, what I claim as new and useful, and desire to secure by Letters Patent of the United States, is—

A decoy-trap comprising the bait or decoy chamber 1, provided with the inlet 3 surrounded by the pointed converging wires 4 4, the closed cover 5 hinged at one end to said bait-chamber, and fastened at the other end by a hasp and staple 6, and provided with the orifice 7 and the fixed transverse partitions 8 8 having alined slots 22, in combination with the spring-trap 9 having the open-frame platform 19 and the duplex spring 20, the outer ends 21 21 of which extend through the slots 22 and engage the rectangular jaws 12 12', substantially as shown and described.

In testimony whereof I hereunto affix my signature in presence of two witnesses.

JAMES WILLIAM ANDERSON.

Witnesses:
B. Du Bon,
E. M. Devall.